INVENTORS.
KENNETH L. RAYMOND and
FRANCIS H. STITES

BY Peter Xiarhos

AGENT.

United States Patent Office 3,488,510
Patented Jan. 6, 1970

3,488,510
RADIATION SENSITIVE OBJECT DETECTION SYSTEM
Kenneth L. Raymond, Jr., Chelmsford, and Francis H. Stites, Wayland, Mass., assignors to Sylvania Electric Products Inc., a corporation of Delaware
Filed June 12, 1967, Ser. No. 645,240
Int. Cl. G06m 7/00
U.S. Cl. 250—222          15 Claims

ABSTRACT OF THE DISCLOSURE

System for optically detecting the presence or absence of a vehicle in a region between two opposed points. A photoresponsive device is disposed at each of the two points in the optical path of light from a multifaceted light scanner. When a vehicle is present, one of the devices is periodically irradiated with light from the scanner. As a result, a capacitor is charged and an indicating relay coupled thereto is operated to indicate the presence of the vehicle. When the vehicle is no longer present, both of the photoresponsive devices are periodically irradiated with light from the scanner, and a threshold circuit coupled to the devices operates to allow the capacitor to become discharged. The indicating relay is rendered operative by the discharged condition of the capacitor to indicate the absence of the vehicle.

BACKGROUND OF THE INVENTION

The instant invention relates to an optical detection system and, more particularly, to a system for optically detecting the presence of an object in a region between a pair of opposed points or the absence of an object from said region.

Various types of detectors are known for ascertaining and indicating the presence or absence of objects, such as moving vehicles, at a predetermined location or in a region between a pair of opposed points. Some typical examples include optical arrangements, trip mechanisms, magnetic sensing devices, radio frequency and ultrasonic frequency transceivers, wheel or axle counters, code or indicia sensing apparatus, and pressure actuated devices. The present invention is primarily concerned with optical vehicle detection systems and apparatus.

One of the best known systems of an optical nature for detecting the presence of an object in a region between a pair of opposed points includes a light source at a first location for providing a continuous light beam and a photocell or other photoresponsive device at a second location in the path of the light beam. The operation is such that when an object passes between the light source and the photocell, the beam is interrupted and an indicator coupled to the photocell by suitable circuitry is operated to indicate the presence of the object. The above-described system has proven to be generally unsatisfactory in providing accurate indications or counts of objects appearing in a region between a pair of opposed points because of its susceptibility to false or improper operation.

For example, it is quite possible for the integrity of a system of the above type to be seriously disturbed by momentary interruptions of the light beam, as by birds, or fortuitous environmental disturbances, for example, heavy snow. It is also possible for an object, for example, a vehicle, to go undetected as it intercepts the light beam if sunlight is reflected by a side of the vehicle onto the photocell as the vehicle interrupts the beam. A still further disadvantage of the above-described system, when used for the detection of vehicles, is that it is quite possible for a cab-trailer combination, wherein an open region exists between the cab and trailer vehicles, to be detected, or counted, twice. That is, the cab is detected or counted as one vehicle and the trailer is detected or counted as a second vehicle. Furthermore, when a system of the above-described construction is used as part of a security system to detect the presence of intruders, it is a simple matter for an intruder to "cheat" the system by shining light from an auxiliary light source onto the photocell as he intercepts the light beam.

Another system which is similar to that described above utilizes chopped light rather than a continuous light beam. Such a system has been found to be similarly susceptible to improper or undesirable operation for essentially the same reasons briefly outlined hereinabove.

Other optical arrangements, for example, plural pairs of light sources and photocells, or photocell arrangements utilizing differences in the intensity of light falling upon a pair of photocells, have similarly proved to be impractical for one or more of the reasons outlined hereinabove.

SUMMARY OF THE INVENTION

The present invention is adapted to detect the presence of an object in a region or the absence of an object from said region while avoiding the above-described difficulties and disadvantages associated with prior art object detection systems and apparatus. Briefly, the object detection system of the present invention comprises a source of periodic electromagnetic radiation, a first radiation-responsive means, a second radiation-responsive means, and an indicating means. The first radiation-responsive means is placed at a first location and spaced from the second radiation-responsive means. The first and second radiation-responsive means are positioned such that both are in radiation-receiving relationship with the periodic electromagnetic radiation provided by the source of electromagnetic radiaiton.

The operation of the above-described object detection system is such that when an object is present in a region between the first and second radiation-responsive means, only one of the radiation-responsive means receives periodic electromagnetic radiation from the source of electromagnetic radiation. In response to one of the radiation-responsive means receiving periodic electromagnetic radiation, the indicating means indicates that an object is present in the region. When no object is present in the region between the radiation-responsive means, both of the radiation-responsive means receive periodic electromagnetic radiation from the source of electromagnetic radiation. In response to both of the radiation-responsive means receiving periodic electromagnetic radiation, the indicating means indicates that no object is present in the region.

A particular feature of the present invention is the inclusion in the indicating means of a storage means which prevents indications by the indicating means when the electromagnetic radiation provided by the source of electromagnetic radiation is momentarily intercepted, as by birds, snow, etc. Additional features include additional storage means provided in the indicating means for eliminating effects of sunlight, and for preventing multiple detections of a single object, for example, a cab-trailer combination. Moreover, as will become more fully apparent hereinafter, when the detection system briefly described above is employed as part of a security system, such system is not readily susceptible to being "cheated" by an unauthorized individual.

DESCRIPTION OF THE PREFERRED EMBODIMENT

Figure 1:
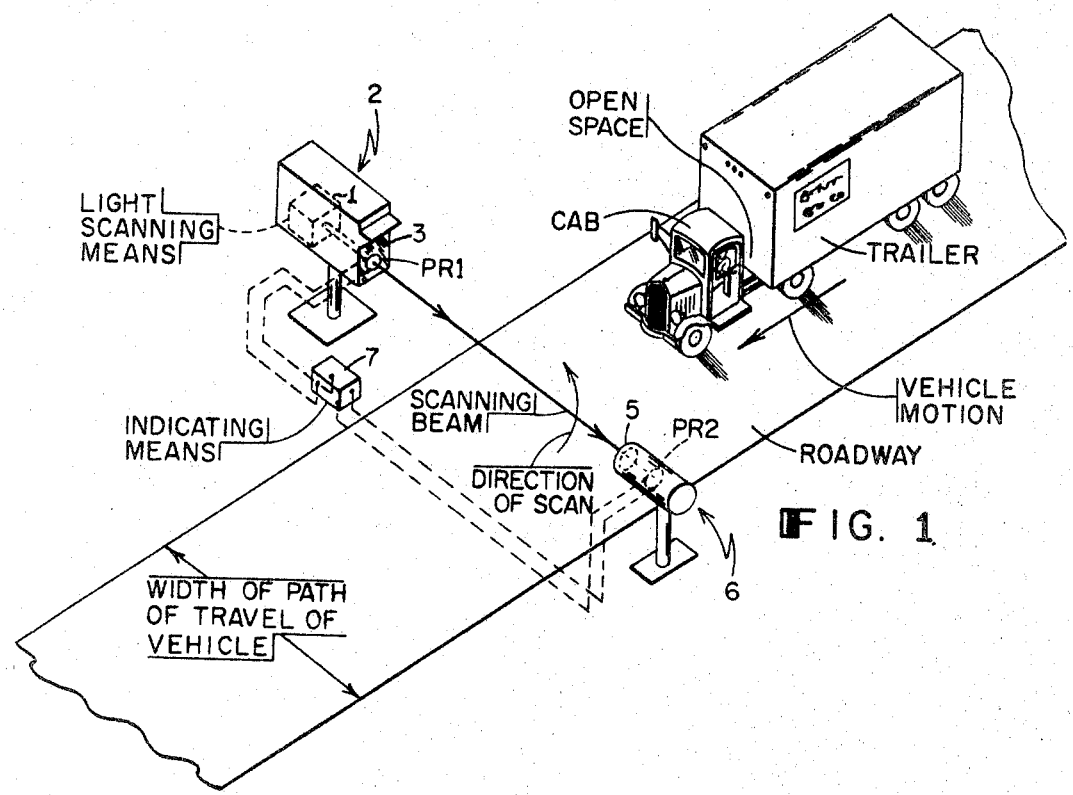
FIG. 1 is a schematic illustration of the system of the invention for optically detecting the presence or absence of an object in a region between a pair of opposed points.

Referring to FIG. 1, there is shown an object detection system of the invention for detecting the presence or absence of an object, such as a vehicle, on a roadway in a region between two opposed points. As shown in FIG. 1, the object detection system comprises: a light scanning means 1 disposed within a local unit 2 provided with a transparent glass plate 3; a first photoresponsive device PR1 disposed in the optical path of the light provided by the light scanning means 1 and fixedly secured to the glass plate 3; a second photoresponsive device PR2 disposed in the optical path of the light provided by the light scanning means 1 and located together with a collecting lens 5 within a remote unit 6; and an indicating means 7 coupled to the photoresponsive devices PR1 and PR2.

Although shown only schematically in FIG. 1, the light scanning means 1 is preferably of a construction described in detail in United States Patent No. 3,225,177 to Stites et al. for use in vehicle coded label scanning systems. The Stites et al. patent is assigned to the assignee of the present application. Briefly, the light scanning means 1, as described in the above-cited patent, comprises a rotatable wheel having a plurality of reflective mirror elements disposed on the periphery thereof, and a continuous-light source. In operation, the mirror elements are adapted, upon a rotating motion being imparted to the rotatable wheel by a suitable motor, to periodically reflect light from the light source in a plurality of vertical scanning beams, one scanning beam for each rotation of each mirror element.

For the purpose of the present invention, a fourteen-inch diameter rotatable wheel provided with fifteen peripheral mirror elements and operable at a speed of 1200 revolutions per minute has been found to be entirely acceptable. However, other suitable sources of periodic light, for example, light choppers, are also contemplated. For further details relating to the construction and operation of the light scanning means employed in the present invention, reference may be made to the above-cited patent.

The photoresponsive devices PR1 and PR2 employed in the object detection system of FIG. 1 are each of a type which develops a voltage as a function of light intensity. Two well-known examples of devices exhibiting the above-described capability are solar cells and selenium cells. It is additionally contemplated that variable-resistance photoresponsive devices, for example, photocells, photo-diodes, and photo field effect devices be used.

Briefly, the operation of the object detection system of FIG. 1 is as follows. When no object is present in the region between the local unit 2 and the remote unit 6, both of the photoresponsive devices PR1 and PR2, for example, solar cells, are periodically irradiated with the scanning light from the light scanning means 1 inasmuch as both devices are disposed in the optical path of the light from the light scanning means 1. Each of the photoresponsive devices PR1 and PR2 receives light once during the time of each scan. If fifteen mirror elements are used by the light scanning means 1 as previously suggested, each of the photoresponsive devices PR1 and PR2 receives light fifteen times during each revolution of the scanning wheel included in the light scanning means 1. Because both of the photoresponsive devices PR1 and PR2 are simultaneously exposed to light from the light scanning means 1, the modulation frequency of the light received by the remote photoresponsive device PR2 is accordingly the same as the modulation frequency of the light received by the local photoresponsive device PR1. Moreover, the modulation frequency of the light received by the remote device PR2 is in phase with the modulation frequency of the light received by the local device PR1.

In response to the periodic exposure to the light from the light scanning means 1, each of the photoresponsive devices PR1 and PR2 develops a series of voltage signals, one voltage signal being produced by each of the photoresponsive devices PR1 and PR2 during each scan. The series of voltage signals provided by each of the photoresponsive devices PR1 and PR2 is applied to the indicating means 7 coupled thereto. The indicating means 7 is rendered operative by the presence of the series of voltage signals from both of the photoresponsive devices PR1 and PR2 to indicate the absence of a vehicle in the region between the local unit 2 and the remote unit 6.

When a vehicle is present between the local unit 2 and the remote unit 6, only the local photoresponsive device PR1 is irradiated periodically with light from the light scanning means 1. Since the remote photoresponsive device PR2 is obscured from the light from the light scanning means 1, it is substantially in darkness and accordingly acts as an open circuit. Therefore, only the photoresponsive device PR1 produces a series of voltage signals. These voltage signals are received by the indicating means 7 which is rendered operative to indicate the presence of a vehicle in the region between the local unit 2 and the remote unit 6. The indicating means 7 of FIG. 1 is shown in greater detail in FIG. 2.

Figure 2:
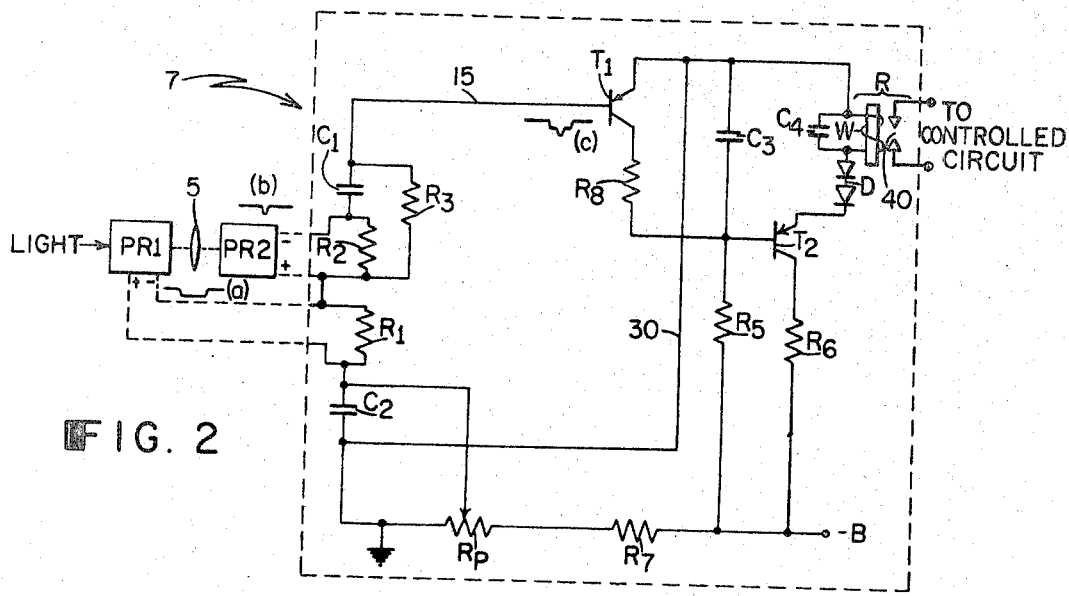
FIG. 2 is a detailed schematic drawing of an indicating circuit employed in the system of FIG. 1 for indicating the presence or absence of an object in the region between the pair of opposed points.

As shown in FIG. 2, the individual output voltage signals produced by the photoresponsive device PR1 during periodic exposure to light from the light scanning means 1 are applied to a load resistor $R_1$ coupled to the output terminals of the photoresponsive device PR1. The individual output voltage signals produced by the photoresponsive device PR2 during periodic exposure to light from the light scanning means 1 are applied to a load circuit including a resistor $R_2$, a resistor $R_3$, and an alternating current bypass capacitor $C_1$. A second alternating current bypass capacitor $C_2$ is directly connected between the load resistor $R_1$ and ground potential.

A first pnp transistor $T_1$ is provided for amplifying signals received from the load circuits associated with the photoresponsive devices PR1 and PR2. As shown in FIG. 2, the base of the transistor $T_1$ is directly connected via a line 15 to the series-connected load circuits associated with the photoresponsive devices PR1 and PR2. The emitter of the transistor $T_1$ is directly connected to ground potential via a line 30, to one end of a storage capacitor $C_3$, and to the junction formed by one end of a storage capacitor $C_4$ and one end of a relay winding W included as part of a reed relay R. The collector of the transistor $T_1$, which carries the full current of the transistor $T_1$ when such transistor is rendered conducting, is coupled to the base of a second pnp transistor $T_2$ through a load resistor $R_8$, to a second end of the storage capacitor $C_3$, and to one end of a load resistor $R_5$. The other end of the load resistor $R_5$ is directly connected to a direct current source $-B$.

The transistor $T_2$ is adapted to operate as an emitter follower. Accordingly, the transistor $T_2$ serves to control the energization of the relay winding W and the opening and closure of a pair of contacts 40 associated with the reed relay R. The relay winding W is coupled to the emitter of the transistor $T_2$ through a pair of diodes D, typically silicon diodes. The collector of the transistor $T_2$ is coupled to the direct current sources $-B$ through a power-limiting collector load resistor $R_6$.

The threshold operating point of the indicating means 7, and particularly the threshold operating point of the transistor $T_1$, is established by means of a variable potentiometer $R_P$. As shown in FIG. 2, one end of the variable potentiometer $R_P$ is connected directly to ground potential; the other end thereof is coupled to the direct current source —B through a current-limiting resistor $R_7$. The movable tap of the variable potentiometer $R_P$ is directly connected to the junction of the load resistor $R_1$ and the alternating current bypass capacitor $C_2$. The value of the potentiometer resistance is selected such that the transistor $T_1$ conducts only when both of the photoresponsive devices PR1 and PR2 are simultaneously exposed to light from the light scanning means 1 and the modulation frequency of the light received by each device is the same and in phase. Thus, it is evident that the photoresponsive devices PR1 and PR2 together with their respective loads, and the transistor $T_1$, constitute a series AND gate. That is, the photoresponsive device PR1 and PR2 and their respective loads function as serial inputs of the AND gate, and the collector of the transistor $T_1$ functions as the output of the AND gate. Thus, in accordance with the conventional mode of operation of an AND gate, if only one of the photoresponsive devices is exposed to light, and the other photoresponsive device acts as an open circuit, the transistor $T_1$ does not conduct.

The operation of the indicating means 7 will now be described in detail. Prior to an object, for example, a vehicle, arriving in the region of the roadway between the local unit 2 and the remote unit 6, that is, when a vehicle is absent from said region, both of the photoresponsive devices PR1 and PR2 are periodically exposed to light from the light scanning means 1 of FIG. 1. Once during each scan, a voltage signal of the configuration shown at (a) in FIG. 2 is provided by the local photoresponsive device PR1 to the load resistor $R_1$, similarly, a voltage signal of a configuration such as shown at (b) in FIG. 2 is provided by the remote photoresponsive device PR2 to the load circuit comprising the resistors $R_2$ and $R_3$ and the alternating current bypass capacitor $C_1$. The width of the voltage signal provided by the photoresponsive device PR2 and shown at (b) is less than that provided by the photoresponsive device PR1 and shown at (a) because the remote photoresponsive device PR2 is farther away from the light scanning means 1 than the photoresponsive device PR1 and accordingly is exposed to the arc of a scanning beam from the light scanning means 1 for a shorter period of time than the less remote local photoresponsive device PR1.

The voltage signals appearing across the photoresponsive devices PR1 and PR2 as a result of periodic scanning are converted to an alternating current by the load resistors $R_1$, $R_2$, and $R_3$ associated therewith. The alternating current is applied to the base of the first pnp transistor $T_1$ via the line 15. The waveform of the voltage signal present at the base of the transistor $T_1$ after a single scan is shown at (c) in FIG. 2. It may be noted from (a)–(c) of FIG. 2 that the voltage signal appearing at the base of the transistor $T_1$ results fro ma superimposing of the voltage signal provided by the photoresponsive device PR2 on the voltage signal provided by the photoresponsive device PR1.

Any direct current resulting from the exposure of the photoresponsive devices PR1 and PR2 to continuous unmodulated light, for example, sunlight, is prevented from being applied to the base of the first transistor $T_1$ by the alternating current bypass capacitor $C_1$. Specifically, any charge developed across the capacitor $C_1$ due to the effects of continuous sunlight is discharged to ground via a discharge path including the load resistor $R_3$, the load resistor $R_1$, and the potentiometer $R_P$.

In response to the combined voltages present at the base of the grounded-emitter transistor $T_1$ after each scan, the threshold operating point of the transistor $T_1$ is exceeded, and the transistor $T_1$ is biased into full conduction. The periodic conduction of the transistor $T_1$ as the photoresponsive devices PR1 and PR2 are periodically exposed to scanning light serves to maintain the storage capacitor $C_3$ in a discharged condition and also to prevent the transistor $T_2$ from conducting sufficient current to energize the relay winding W. That is, during the time of conduction of the transistor $T_1$, during each scan, a discharge path including the load resistor $R_8$, the conducting transistor $T_1$, and the line 30 is established for the storage capacitor $C_3$. Thus, any charge developed by the storage capacitor $C_3$ via the direct current source —B and the load resistor $R_5$ during the time of nonconduction of the transistor $T_1$ during each scan, is dissipated to ground potential via the above-described discharge path.

As mentioned above, the full collector current of the transistor $T_1$ is applied to the base of the transistor $T_2$ when the transistor $T_1$ is rendered conducting. Because of the positive-going output signal of the transistor $T_1$ and because of the discharged condition of the storage capacitor $C_3$, the base-emitter potential of the transistor $T_2$ is maintained sufficiently positive to prevent the transistor $T_2$ from conducting and drawing full emitter current. Accordingly, the relay winding W of the reed relay R is not energized and the relay contacts 40 are maintained in their opened condition. Thus, it is evident that the deenergized state of the reed relay R is indicative of the absence of a vehicle from the roadway in the region between the local unit 2 and the remote unit 6.

As a vehicle enters the region between the local unit 2 and the remote unit 6, the indicating means 7 operates in the following manner. As the vehicle passes between the local unit 2 and the remote unit 6, the scanning light beam present between the photoresponsive devices PR1 and PR2 is interrupted by the vehicle and the remote photoresponsive device PR2 is obscured from the light of the light scanning means 1 by the physical presence of the vehicle. Accordingly, only the photoresponsive device PR1 is periodically exposed to the light from the light scanning means 1. A series of voltage signals, each signal having the configuration shown at (a) in FIG. 2, is produced by the photoresponsive device PR1. However, since the remote photoresponsive device PR2 is not illuminated, it acs as an open circuit and the threshold level of the transistor $T_1$ is not attained. Accordingly, the transistor $T_1$ does not conduct.

In the period of time that the vehicle passes between the units 2 and 6, the capacitor $C_3$ is charged up through the load resistor $R_5$ by the direct current source —B. Since, as mentioned above, the transistor $T_1$ does not conduct in the situation where only one of the photoresponsive devices is illuminated, no discharge path is provided for the storage capacitor $C_3$ during the time that it is being charged by the direct current source —B. Furthermore, as a charge is gradually built up by the capacitor $C_3$, the base potential of the transistor $T_2$ becomes more negative with respect to the emitter. When the base-emitter potential of the transistor $T_2$ reaches a predetermined value, the transistor $T_2$ is rendered fully conducting. An output current signal of sufficient amplitude is accordingly provided by the emitter of the transistor $T_2$ to energize the relay winding W, and to cause the closing of the reed relay contacts 40. The contacts 40 may be coupled to an indicating light, counter, alarm, or other suitable controlled circuit. It is evident, therefore, that the energized state of the reed relay R is indicative of the presence of the vehicle in the region between the local unit 2 and the remote unit 6.

When the vehicle leaves the region between the local unit 2 and the remote unit 6, both of the photoresponsive devices PR1 and PR2 are again periodically simultaneously exposed to light from the light scanning means 1. Because of the simultaneous exposure of the photoresponsive devices PR1 and PR2, the transistor $T_1$ is rendered conducting by the alternating current developed by the load circuits associated with the photoresponsive devices PR1 and PR2. As previously described, a discharge path is established by the conducting transistor $T_1$ for the previously-charged storage capacitor $C_3$. It may be recalled that the capacitor $C_3$ was fully charged by the direct current source —B during the time that the vehicle was in the region between the units 2 and 6.

During the time of the conduction of the transistor $T_1$ during each scan, a portion of the charge retained by the capacitor $C_3$ is dissipated to ground via the previously-described discharge path including the collector load resistor $R_8$, the conducting transistor $T_1$, and the line 30. After several operations of the transistor $T_1$, for example, two to five operations, the capacitor $C_3$ is substantially completely discharged. The requirement of two to five operations of the transistor $T_1$ is to prevent any transient effects resulting from temporary, spurious operation of either or both of the photoresponsive devices PR1 and PR2 from adversely affecting the operation of the indicating means 7. Thus, as the capacitors is discharged, the base potential of the second transistor $T_2$ becomes sufficiently positive with respect to the emitter thereof to render the transistor $T_2$ substantially nonconducting. As the transistor $T_2$ becomes substantially nonconducting, the previously energized reed relay R is de-energized and the reed relay contacts 40 are reopened. To insure that the relay winding W is not improperly energized and the contacts 40 closed during the discharge of the storage capacitor $C_3$, the diodes D provide a voltage drop of sufficient magnitude to prevent energization of the relay winding W. The diodes D also serve to protect the transistor $T_2$ from current overloading. Again, it is evident that the de-energized state of the reed relay R is indicative of the absence of a vehicle from the region between the units 2 and 6.

It is to be noted that the reed relay R of FIG. 2 is not operated twice for a vehicle combination comprising a cab and a trailer or body connected to the cab wherein an open space exists between the cab and the trailer or body. Such dual operation is prevented by the capacitor $C_4$ coupled to the reed relay winding W. The specific operation of the indicating means 7 as a cab-trailer arrangement interrupts the scanning beam is as follows.

When the cab intercepts the scanning beam of the light scanning means 1, the capacitor $C_3$ is charged to a sufficient degree by the direct current source —B to cause the transistor $T_2$ to conduct. The relay winding W, therefore, is energized and the reed relay contacts 40 are closed. An indication is accordingly provided to the controlled circuit of the presence of the cab. During the time of the open space between the cab and the trailer, the capacitor $C_3$, which was previously charged during the presence of the cab, partially discharges as both of the photoresponsive devices PR1 and PR2 are irradiated with light to allow the transistor $T_1$ to conduct and to establish a discharge path for the capacitor $C_3$. In response to the partial discharge of the capacitor $C_3$, the transistor $T_2$ is rendered less conducting. The relay winding W, however, does not become de-energized. De-energization of the relay winding W is prevented by selecting a particular value of capacitance for the capacitor $C_4$ such that for a partial discharge of the capacitor $C_3$, and for reduced conduction in the transistor $T_2$, the charge stored by the capacitor $C_4$ during the conduction of the transistor $T_2$ provides sufficient potential across the relay winding W to maintain the winding in its energized state.

When the trailer portion of the cab-trailer combination interrupts the scanning beam after the duration of the open space, the storage capacitor $C_3$ is charged up again, the transistor $T_2$ is rendered more conductive by the charging capacitor $C_3$, and additional current is provided to the relay winding W to maintain the relay R in its energized state.

It is to be further noted that the reed relay R of FIG. 2 is not falsely operated by momentary interruptions of the scanning beams, as by birds, heavy snow, etc. Such false operation of the reed relay R of FIG. 2 is prevented by selecting a particular value of capacitance for the storage capacitor $C_3$ such that the small amount of charge that is developed by the capacitor $C_3$ in the short duration that a scanning beam is interrupted will not render the base of the transistor $T_2$ sufficiently negative with respect to the emitter so as to drive the transistor $T_2$ into full conduction whereby the relay winding W is energized to close the contacts 40.

Some typical values for the parameters of the components employed in the above-described object detection system are as follows:

| | | |
|---|---|---|
| $T_1$, $T_2$ | | 2N3638 |
| $R_1$ | ohms | 100 |
| $R_2$, $R_3$ | do | 200 |
| $R_5$ | do | 5K |
| $R_6$ | do | 200 |
| $R_7$ | do | 12K |
| $R_8$ | do | 10 |
| $C_1$ | microfarads | 5 |
| $C_2$ | do | 50 |
| $C_3$ | do | 2 |
| $C_4$ | do | 50 |
| $R_P$ | ohms | 500 |
| —B | volts | 18 |
| PR1, PR2 | | (1) |

[1] Solar cells, Type 51C, Hoffman Electronics, Inc.

It will now be apparent that a novel system and apparatus for optically detecting the presence or absence of a vehicle between a pair of opposed points have been disclosed in such full, clear, concise, and exact terms as to enable any person skilled in the art to which such system and apparatus pertain to construct and use the same. It will also be apparent that various changes and modifications may be made in form and detail by those skilled in the art without departing from the spirit and scope of the invention.

We claim:
1. A system for detecting the presence or absence of an object from a region, comprising:
   a source of periodic electromagnetic radiation;
   first radiation-responsive means at a first location and in radiation-receiving relationship to periodic electromagnetic radiation from said source;
   second radiation-responsive means at a second location spaced from the first location and in radiation-receiving relationship to periodic electromagnetic radiation from said source; and
   indicating means operative in response to periodic electromagnetic radiation being received by one of said radiation-responsive means when an object is positioned in a region in the path of the radiation between the source of periodic electromagnetic radiation and the other one of said radiation-responsive means to indicate the presence of the object in the region, and in response to electromagnetic radiation being received by both of said radiation-responsive means to indicate the absence of an object from the region.

2. A system in accordance with claim 1 wherein said indicating means includes:
   threshold means operative to provide an output signal only in response to said first radiation-responsive means and said second radiation-responsive means simultaneously receiving electromagnetic radiation from said source of electromagnetic radiation;
   storage means coupled to said threshold means adapted to assume a first condition when one of said radiation-responsive means receives electromagnetic radiation from said source of electromagnetic radiation and to assume a second condition when both of said radiation-responsive means simultaneously receive electromagnetic radiation from said source of electromagnetic radiation; and
   output means coupled to said storage means and operative in response to said storage means assuming said first condition to assume a corresponding first condition, and in response to said storage means assuming said second condition to assume a corresponding second condition.

3. A system in accordance with claim 2 wherein said output means includes a relay means operative in a first condition or a second condition.

4. A system in accordance with claim 1 wherein said source of electromagnetic radiation is a light source and said first and second radiation-responsive means are light-responsive devices.

5. A system for detecting the presence or absence of an object from a region, comprising:
   a source of electromagnetic radiation and a first radiation-responsive means located at a first location, said first radiation-responsive means being disposed in the path of the radiation from said source of electromagnetic radiation;
   a second radiation-responsive means located at a second location opposing said first location, said second radiation-responsive means being disposed in the path of the radiation from said source of electromagnetic radiation with said first radiation-responsive means located between said source and said second radiation responsive means; and
   indicating means adapted to indicate the presence of an object in the region between said first location and said second location when the object is present in the region and intercepts the path of the radiation between the first and second radiation-responsive means, and to indicate the absence of an object from the region between said first location and said second location when an object is not present in said region.

6. A system for detecting the presence or absence of an object from a region between a pair of opposed points comprising:
   a source of periodic light;
   first photoresponsive means located at a first one of said pair of opposed points and in light-receiving relationship with light from said source;
   second photoresponsive means located at the other one of said pair of opposed points and in light-receiving relationship with light from said source;
   transistor circuit means operative to periodically provide an output signal in response to both said first and second photoresponsive means receiving periodic light from said light source;
   a direct current source;
   a storage capacitor means coupled to said transistor circuit means and to said direct current source and operative to be charged by said direct current source during the time that one of said photoresponsive means receives light from said light source, and to be discharged during the time that both of said photoresponsive means receive light from said light source and said transistor circuit means is periodically rendered operative; and
   output circuit means coupled to said storage capacitor means and operative when said storage capacitor means is in a charged condition to provide a first signal and operative when said storage capacitor means is in a discharged condition to provide a second signal.

7. A system in accordance with claim 6 wherein said output circuit means includes:
   relay means; a second transistor circuit means coupled to said storage capacitor means and to said relay means, said second transistor circuit means being operative when said storage capacitor means is in a charged condition to operate said relay means and when said storage capacitor means is in a discharged condition to prevent operation of said relay means.

8. A system in accordance with claim 7 further including:
   a storage capacitor means associated with said relay means and the second transistor circuit means for delaying said relay means from changing from its first condition of operation to its second condition of operation in response to said second transistor means being rendered operative whereby said relay means does not change from its first condition of operation to its second condition of operation in response to both of said photoresponsive means receiving light for a brief duration of time.

9. A system for detecting the presence of a vehicle in a region between a pair of opposed points or the absence of a vehicle from said region, comprising:
   vehicle means adapted to travel over a roadway having a predetermined width;
   a local unit including a source of electromagnetic radiation and a first radiation-responsive means located at one of said pair of opposed points on one side of the roadway, said first radiation-responsive means being disposed in the path of the radiation from said source of electromagnetic radiation;
   a remote unit including a second radiation-responsive means located at the opposite one of said pair of opposed points on the other side of said roadway, said second radiation-responsive means being disposed in the path of the radiation from said source of electromagnetic radiation; and
   indicating means adapted to indicate the presence of said vehicle means in the region between said local unit and said remote unit when said vehicle means is located on the roadway in the region between said local unit and said remote unit so as to intercept the path of the radiation between said first radiation-responsive means and and said second radiation-responsive means, and to indicate the absence of said vehicle means from the region between said local unit and said remote unit when said vehicle means is not present on the roadway in the region between said local unit and said remote unit.

10. A system in accordance with claim 9 wherein said vehicle means is a vehicle of a predetermined length having an open space along a portion of the length thereof in the path of the radiation between the first and second radiation-responsive means, and wherein said indicating means includes means for preventing an indication of the absence of a vehicle from the region between said local unit and said remote unit during the time of passage of said open space.

11. A system in accordance with claim 10 wherein said vehicle having an open space along a portion of the length thereof is a cab-and-body arrangement, said cab being separated from said body by said open space.

12. An electro-optical circuit comprising:
   a first photoresponsive means located at a first point and adapted to be illuminated with periodic light;
   a second photoresponsive means located at a second point opposing said first point and adapted to be illuminated with periodic light;
   said first and second photoresponsive means being disposed in a common light path;
   a source of periodic light for illuminating said first and second photoresponsive means with said first photoresponsive means located between said source of periodic light and said second photoresponsive means; and
   threshold means operative to provide a periodic output signal only in response to said first photoresponsive means and said second photoresponsive means being simultaneously periodically illuminated with light from said source of periodic light.

13. An electro-optical circuit in accordance with claim 12 further including:
   storage means coupled to said threshold means and adapted to assume a first condition when only one of said photoresponsive means is illuminated with light from the source of periodic light and to assume a second condition when both of said photoresponsive means are illuminated with light from the source of periodic light; and output means coupled to said storage means and operative in response to said storage means assuming said first condition to assume a corresponding first condition, and in response to said storage means assuming said second condition to assume a corresponding second condition.

14. An electro-optical circuit in accordance with claim 12 wherein said first and second photoresponsive means are solar cells.

15. An electro-optical circuit in accordance with claim 13 wherein said output means includes a relay means.

References Cited

UNITED STATES PATENTS

| | | | |
|---|---|---|---|
| 2,547,332 | 4/1951 | Loveless et al. | 250—221 X |
| 3,225,177 | 12/1965 | Stites et al. | 340—146.3 X |
| 3,242,341 | 3/1966 | Woodward | 250—221 |
| 3,365,572 | 1/1968 | Strauss | 250—223 X |

WALTER STOLWEIN, Primary Examiner

U.S. Cl. X.R.

250—209